US009551559B2

(12) United States Patent
Tschorn (10) Patent No.: US 9,551,559 B2
(45) Date of Patent: Jan. 24, 2017

(54) COMPACT 3D CONTACT MEASURING DEVICE

(71) Applicant: Tschorn GmbH, Pluderhausen (DE)

(72) Inventor: Ralf Tschorn, Pluderhausen (DE)

(73) Assignee: Tschorn GmbH, Pluderhausen (DE)

( * ) Notice: Subject to any disclaimer, the term of this patent is extended or adjusted under 35 U.S.C. 154(b) by 231 days.

(21) Appl. No.: 14/366,980

(22) PCT Filed: Dec. 12, 2012

(86) PCT No.: PCT/EP2012/075275
§ 371 (c)(1),
(2) Date: Jun. 19, 2014

(87) PCT Pub. No.: WO2013/092354
PCT Pub. Date: Jun. 27, 2013

(65) Prior Publication Data
US 2014/0366393 A1    Dec. 18, 2014

(30) Foreign Application Priority Data

Dec. 21, 2011  (DE) .......................... 10 2011 056 736

(51) Int. Cl.
*G01B 5/012*        (2006.01)
(52) U.S. Cl.
CPC ..................................... *G01B 5/012* (2013.01)
(58) Field of Classification Search
CPC ..................................................... G01B 5/012
(Continued)

(56) References Cited

U.S. PATENT DOCUMENTS 1,703,120 A * 2/1929 Steinlb ...................... G01B 3/22
33/559
1,820,370 A * 8/1931 Aldeborgh ............... G01B 3/22
33/559
(Continued)

FOREIGN PATENT DOCUMENTS

DE        3701730       1/1987
DE       19502840       1/1995
(Continued)

OTHER PUBLICATIONS

International Preliminary Report on Patentability; Jun. 24, 2014; The International Bureau of WIPO.

*Primary Examiner* — Christopher Fulton
(74) *Attorney, Agent, or Firm* — Emch, Schaffer, Schaub & Porcello Co., L.P.A.

(57) ABSTRACT

The 3D contact measuring device senses work pieces in machine tools for adjusting the zero point of a numerically controlled machine tool or for positioning tasks. The device comprises a preferably elongated housing, a sensing arm projecting from the housing and bearing a sensing tip. The sensing arm being movable in the direction of a measuring axis and pivotable in all directions about the measuring axis. A sensing lever is connected to the sensing arm and forms the first universal joint, and a measuring device for detecting a parameter, which characterizes the displacement and/or the pivoting of the sensing arm. A further control surface forms a second universal joint. An elongated toothed rack of a gear transmission is aligned along the measuring axis and is movably supported and is coupled to the sensing lever via the second universal joint.

15 Claims, 3 Drawing Sheets

(58) Field of Classification Search
USPC .......................................................... 33/559
See application file for complete search history.

(56) References Cited

U.S. PATENT DOCUMENTS

| | | | | |
|---|---|---|---|---|
| 2,799,941 A * | 7/1957 | Emery | ..................... | G01B 3/22 33/559 |
| 3,660,906 A * | 5/1972 | Zimmerman | .......... | G01B 7/012 33/559 |
| 4,941,266 A * | 7/1990 | Bissegger | .............. | G01B 5/012 33/556 |
| 5,365,673 A * | 11/1994 | Haimer | .................. | G01B 5/012 33/503 |
| 5,394,618 A * | 3/1995 | Morz | ..................... | G01B 5/012 33/556 |
| 5,659,969 A * | 8/1997 | Butler | .................. | G01B 11/007 33/556 |
| 5,682,682 A * | 11/1997 | Renfrew | ................... | G01B 3/22 33/556 |
| 7,024,786 B2 * | 4/2006 | Haimer | ................... | G01B 5/012 33/556 |
| 7,111,410 B2 * | 9/2006 | Haimer | ................... | G01B 5/012 33/559 |
| 7,155,839 B2 * | 1/2007 | Schopf | ................... | G01B 5/012 33/558 |
| 2015/0101205 A1 * | 4/2015 | Jensen | ................... | G01B 5/012 33/503 |

FOREIGN PATENT DOCUMENTS

| | | | | |
|---|---|---|---|---|
| DE | | 10334503 | 7/2003 | |
| DE | EP | 1503168 A1 * | 2/2005 | ............... G01B 3/22 |
| GB | | 804.534 | 11/1958 | |
| JP | | 07043101 | 2/1995 | |

* cited by examiner

COMPACT 3D CONTACT MEASURING DEVICE

CROSS REFERENCE TO RELATED APPLICATIONS

The present application is based upon and claims the benefit of PCT/EP2012/075275, filed 12 Dec. 2012.

BACKGROUND OF THE INVENTION

The present invention relates in general to a 3D contact measuring device and in particular to a 3D contact measuring device, which is in particular suitable for tactile sensing workpieces in the direction of a measuring axis and transverse to the measuring axis.

In general, such 3D contact measuring devices comprise a sensing arm, which projects from the housing and which bears a sensing tip, wherein said sensing arm can be moved relative to the housing in the direction of a measuring axis and can be pivoted in all directions about the measuring axis, and a measuring device for detecting the deflection of the sensing arm. Typically, common mechanical gauges are used for this purpose. For the most part, they comprise a round scale and an analog display, wherein the longitudinal movement of a measuring bolt is transferred to a rotatable indicator of the gauge display by means of a toothed rack, which is attached to an inner end of the measuring bolt, and by means of a gear transmission, which is driven by means of the toothed rack. Gauges comprising a digital display are also used.

The 3D contact measuring devices can be used, e.g., for adjusting the zero point of a numerically controlled machine tool in relation to the workpiece, which is to be machined. For this purpose, the contact measuring device is clamped into a machine tool spindle and is moved with its sensing tip to a reference surface of the workpiece. By further advancing the machine tool spindle, the sensing arm is then pushed away from the workpiece, until the indicator of the gauge reaches its zero position.

SUMMARY OF THE INVENTION

DE 195 02 840 C2 describes a generic multi-coordinate contact measuring device, which comprises a housing, a sensing lever, which can be moved in the direction of a measuring axis relative to the housing and which is guided on the housing so as to be pivotable in all directions about a pivot point, which is located on the measuring axis, by means of a universal joint, wherein said sensing lever is pretensioned in a resilient manner into a resting position and has a sensing arm, which projects from the housing, and a coupling arm, which projects away opposite to the sensing arm in relation to the pivot point, a coupling piece, which is guided in the housing so as to be movable in the direction of the measuring axis and which is formed substantially in a sleeve-shaped manner, surrounds the sensing lever and is supported and guided in the housing so as to be capable of being moved, and a measuring device, which detects the position of the coupling piece in relation to the housing. The sensing arm bears at its free end a sensing tip and is fastened in the coupling arm with its other end. The other free end of the coupling arm, which is located at a distance in relation to the pivot point of the sensing tip, comprises an outer control surface, which, in the resting position of the sensing lever, is rotationally symmetrical to the measuring axis, comprising a generatrix, which has the shape of a segment of a circle, the circle center of which is located eccentrically to the rotational axis of symmetry. This outer control surface interacts with an inner control surface, which, at the end of the coupling piece, which is located axially spaced apart from the pivot point, is in the form of a truncated cone surface comprising a linear generatrix, in such a manner that the coupling arm entrains the coupling piece in the direction of the measuring axis, both when moving the sensing arm in the direction of the measuring axis as well as in response to deflecting the sensing arm about the pivot point. To detect the displacement of the coupling piece, provision is made for a mechanical gauge as measuring device, which is laterally attached to the housing and which is coupled to the coupling piece via a coupling pin, which runs transverse to the measuring axis and which can be moved in the direction of the measuring axis. The coupling pin projects into the gauge through a longitudinal slit in an intermediate wall of the contact measuring device and acts on a measuring and display mechanism of the gauge.

During operation, the contact measuring device is held in a machine tool or a measuring device or the like by means of a taper shank. In response to an actuation of the sensing tip in the direction of the measuring axis, the coupling arm entrains the coupling piece, which, in turn, adjusts the mechanical gauge. In response to an actuation of the sensing tip transverse to the measuring axis, the coupling arm pivots about the pivot point, which is defined by the universal joint, wherein the control surfaces, which thereby slide along one another, convert the pivot movement of the sensing lever into an axial displacement of the coupling sleeve, which is detected by the gauge and which is used as measuring value for the radial distance of the sensing tip from the measuring axis. By designing the interacting control surfaces in a suitable manner, it can be attained that the radial distance of the sensing tip from the measuring axis is converted into the axial adjusting stroke of the coupling piece, which is effected by the pivot movement of the sensing lever, at a linearly proportional 1:1 ratio.

The known contact measuring device is suitable for the applications provided herein. However, it comprises a relatively complex, high-priced construction comprising a plurality of individual components, which are designed in a complicated manner and which are in operative connection with one another. Individually, they each require a relatively large amount of space and make the contact measuring device relatively bulky. For example, the coupling sleeve, which surrounds the sensing lever on the circumference in all directions, greatly increases the construction volume. For the coupling sleeve, provision must be made for a separate guide in addition to the guides for the sensing lever and the mechanics of the gauge. The gauge, which is laterally attached to the housing of the contact measuring device and which is arranged even further on the outside of the coupling sleeve in radial direction and which is coupled thereto via the coupling pin, which runs transverse to the measuring axis, increases the construction volume and the disturbing contour of the contact measuring device even more.

A similar multi-coordinate contact measuring device comprising a housing, which can be clamped into a tool spindle, from which a sensing arm having a sensing ball projects at the free end, is known from DE 37 01 730 C2. Said sensing arm is supported in the housing so as to be axially movable and so as to be pivotable in all directions up to a predetermined maximum angle and the deflection of which can be converted by means of a conversion system into a linear movement of a feeder, which is arranged in the housing centrically to the measuring axis and which is guided so as to be capable of being moved against the force of a return spring and against which the sensing arm is supported with the inner end so as to be pivotable in all directions. At its end, which is located at a distance from the sensing ball, the feeder bears a transverse arm, which projects outwards through an axial slit in the housing of the contact measuring device and which is connected to an actuating member of a gauge, which is laterally fastened to the outside of the housing of the contact measuring device. The actuating member can be the measuring bolt of the mechanical gauge, which is guided out of the housing of the gauge.

This caliper construction also comprises a large number of components and a relatively large construction volume, in particular in the direction transverse to the measuring axis.

Based on this, it is an object of the present invention to overcome the above-mentioned disadvantages and shortcomings or to at least reduce them and to reduce the complexity of the construction of a contact measuring device of the above-mentioned type. In particular, it is an object of the present invention to create a multi-coordinate contact measuring device comprising a reduced number of components and a reduced construction volume.

This object is solved according to the invention by means of the 3D contact measuring device comprising the features of the invention.

The 3D contact measuring device according to the invention, in particular for sensing workpieces in machine tools, e.g. for adjusting the zero point of a numerically controlled machine tool or for positioning tasks, comprises a preferably elongated housing, which defines a longitudinal direction, a sensing arm projecting from the housing and bearing a sensing tip, said sensing arm being movable relative to the housing in the direction of a measuring axis, which runs in the longitudinal direction, and pivotable in all directions about the measuring axis, a sensing lever connected to the sensing arm and forming the first universal joint, and a measuring device for detecting a parameter, which characterizes the displacement and/or the pivoting of the sensing arm. The sensing lever comprises an end, which faces the sensing arm and which is fixedly connected thereto, at which a joint head is formed, which comprises an outer control surface, which is supported on an inner control surface of the housing in a rotatable manner, so as to form the first universal joint for pivoting the sensing arm, and an end, which faces away from the sensing arm, at which provision a further control surface for a second universal joint is provided. The measuring device comprises an elongated toothed rack of a gear transmission of the measuring device, which is aligned along the measuring axis and is movably supported and which is coupled effectively to the sensing lever via the second universal joint. In the resting state, the sensing arm, the sensing lever and the toothed rack are arranged centrically to the measuring axis.

According to the invention, the sensing arm, the sensing lever and the toothed rack of the measuring device or of the gauge, respectively, are thus all arranged centrically in the measuring axis, thus behind one another with their longitudinal alignment along the measuring axis when in the resting state, i.e. in the non-deflected initial state. When not considering a toothing of the toothed rack, they are also formed so as to be rotationally symmetrical to the measuring axis. Due to the fact that the measuring axis coincides with the longitudinal axis or "quasi axis of symmetry", respectively, of the housing, the centrical arrangement according to the invention provides for an extremely slim shape of the housing and extremely small lateral dimensions of the caliper. In addition to a reduced construction volume, the construction and the mode of operation of the caliper are also highly simplified and the number of components is reduced. This also benefits a functional reliability and durability of the caliper. This is mainly attained by shifting the toothed rack of the gauge into the measuring axis, so that an axial displacement between the toothed rack and the measuring axis is not present. The gauge is arranged deep in the housing, close to the measuring axis. The caliper is free from cross connection elements, as they are used in the case of common calipers for coupling to the toothed rack of the gauge.

In a preferred embodiment of the invention, the housing of the contact measuring device is formed in multiple parts and comprises at least a first housing section, which accommodates the measuring device and a display device for displaying the parameters detected by means of the measuring device, a housing cover, which is fastened to a front end area of the housing, adjacent to the sensing tip, preferably in a releasable manner, in particular by being screwed on, and a second housing section, which is arranged between the first housing section and the housing cover and which accommodates a guide sleeve for guiding the sensing lever along the measuring axis in a longitudinally movable manner. The first and the second housing section are preferably formed by means of separate housing parts, which are connected to one another, in particular screwed together. On principle, however, they can also be formed integrally with one another. In the alternative, the guide sleeve could also be formed integrally with the second housing section.

The guide sleeve is provided for guiding the sensing lever in response to its longitudinal displacement along the measuring axis. For this purpose, it comprises a cylindrical inner surface, which accommodates and guides an outer surface, in particular at the joint head of the sensing lever, with little play.

In a preferred modification, the guide sleeve comprises a constriction, which is formed in the inner surface of the guide sleeve at a distance from a front surface of the guide sleeve, which faces the sensing tip, and which forms an end stop for limiting the axial displacement of the sensing lever in the guide sleeve. The cylindrical inner surface of the guide sleeve thus protects the components of the contact measuring device, in particular the measuring device, as lateral stop in response to transverse impacts, while the constriction as axial stop protects in particular from overloads in response to axial impacts.

In a preferred embodiment of the invention, the inner control surface of the first universal joint is formed at the housing cover. This facilitates the assembly of the caliper. The inner control surface, however, could also be provided at other housing sections or parts or also at a separate element, which is fastened in the housing.

Regardless of the positioning of the inner control surface of the first universal joint, the latter preferably has a truncated cone-shaped design, which is rotationally symmetrical around the measuring axis, including a linear generatrix. The outer control of the first universal joint, which interacts therewith, can then preferably have a convex design, which is rotationally symmetrical to the measuring axis, including a generatrix, which has the shape of a segment of a circle. The joint head of the sensing lever is thus formed in a spherical manner at least in an area. A reliable universal joint with a simple design is thus created, which provides for a high accuracy in response to the conversion of a pivot movement of the sensing arm into a linear movement of the toothed rack and an accurate detection of the sensing arm deflection.

In a particularly preferred embodiment, the housing cover forms a part of a replaceable structural unit, which comprises the sensing arm, the sensing lever and the guide sleeve for guiding the sensing lever along the measuring axis in a longitudinally movable manner. The preassembled structural unit provides for a quick and simple replacement and for a quick reutilization of the contact measuring device, if the sensing arm is damaged, for example by collision with an obstacle.

Preferably, the sensing arm itself is furthermore held, e.g., screwed on, at the sensing lever, in particular at the end, which comprises the joint head of the first universal joint, so as to be replaceable. In a preferred embodiment, a stud screw connects the joint head of the sensing lever, e.g., to the inner end of the sensing arm. The sensing arm can then be replaced quickly and easily in response to damages, wear, etc. On principle, the sensing arm, however, can also be formed integrally with the sensing lever.

As further overload protection against inadmissible impacts, in particular transverse impacts, the sensing arm can comprise a radial constriction at a location in the vicinity of the sensing lever. Said constriction leads to a predetermined breaking of the sensing arm at that location in response to a predetermined overload. Other components of the contact measuring device can thus be spared from damaging effects of the impacts.

In a preferred embodiment of the invention, the sensing lever comprises a joint head, which comprises an area defining the outer control surface and being spherical at least in an area and extending about an axis vertically to the measuring axis across an angle of slightly larger than 180°, and a tapering wider area, which extends adjacent to the spherical area. The diameter of the tapering area decreases continuously in the direction away from the spherical area towards the end, which faces away from the sensing arm. The tapering area can be formed, e.g., rotationally symmetrically to the measuring axis and in a truncated cone-shaped manner comprising a linear generatrix. At the transition from the spherical area to the tapering area, the joint head then has the largest diameter and an extremely small contact point, with which it is in contact with the inner side of the guide sleeve. This substantially results in a pointwise bearing and guiding of the joint head in the guide sleeve, which ensures good gliding characteristics of the sensing lever in the guide sleeve in response to low friction.

In a preferred embodiment of the invention, the sensing lever, in its front surface, which is located opposite the spherical joint head, furthermore comprises a cone surface, which is rotationally symmetrical around the measuring axis and which widens towards the toothed rack, comprising a linear or slightly curved generatrix, which forms the inner control surface of the second universal joint. This inner control surface then interacts with a preferably spherical outer control surface of the second universal joint, so as to convert a pivoting of the sensing lever into an axial displacement of the toothed rack.

For this conversion of the movements, provision is preferably made for a coupling element, which couples the sensing lever to the toothed rack. The sensing lever acts directly on the coupling element, and the coupling element acts axially on the toothed rack. The coupling element can comprise a spherical end, which defines the outer control surface of the second universal joint and on which the cone surface of the ball lever on the front side, e.g., is rotatably supported. The coupling element is also arranged so as to save installation space, centrically to the measuring axis in resting position.

The coupling element can be a component, which is produced separately from the toothed rack and which is releasably attached to an end face of the toothed rack, preferably screwed on. This makes it possible to use common gauges, wherein only an external thread or the like must then be provided at the toothed rack (or a measuring bolt connected thereto), for accommodating the coupling element.

In the alternative, the coupling element can also be formed integrally at the toothed rack in one piece. For this purpose, the outer control surface of the second universal joint, which is spherical, e.g., must be integrally molded directly to an end face of the toothed rack (or a measuring bolt connected thereto).

A common mechanical gauge, which comprises a mechanical system for transferring the linear path of the toothed rack, e.g. to a circular path of an indicator on an instrument dial of a display or also for converting into a digital output on a numeric display, can be used as measuring device for detecting the parameter, which characterizes the longitudinal and/or transverse deflections of the sensing arm.

In a preferred embodiment, the gauge comprises a gear transmission comprising a rack and pinion gear, which engages with the toothed rack, so as to convert the linear movement of the toothed rack into a circular movement of the rack and pinion gear, and a transfer mechanism, which converts the short rotation of the rack and pinion gear into a long rotary motion, for example of an indicator of the display device. Provision can be made for further toothed wheels for further conversion stages.

The toothed rack is preferably guided so as to glide along the measuring axis by means of slide bearings. To avoid damages to the toothed rack and the gauge in response to inadmissible axial loads, the maximum axial displacement path, which is specified by the second universal joint, is smaller than the maximum stroke length of the toothed rack, which is determined, e.g., by the limit of the measuring range of the measuring device, or which determines it.

The contact measuring device according to the invention furthermore also comprises further components, such as means for preventing a rotation of the sensing lever and of the toothed rack, e.g., about the measuring axis, a return spring, which pretensions the sensing lever and sensing arm to the resting position, a clamping shank for clamping into a machine tool spindle at the end of the housing facing away from the sensing tip, and preferably a device for adjusting and centering the clamping shank in relation to the measuring axis.

Due to the centrical arrangement of the main components of the 3D contact measuring device according to the invention, an extremely compact multi-coordinate caliper is obtained, which comprises a simple, clearly configured, robust construction, and which provides for a simple handling and long service life.

Further advantageous details of the invention follow from subclaims, the drawing, as well as from the corresponding description. An exemplary embodiment of the subject matter of the invention is illustrated in the drawing only as an illustration and not in terms of any kind of limitation.

DETAILED DESCRIPTION OF THE INVENTION

Figure 1:
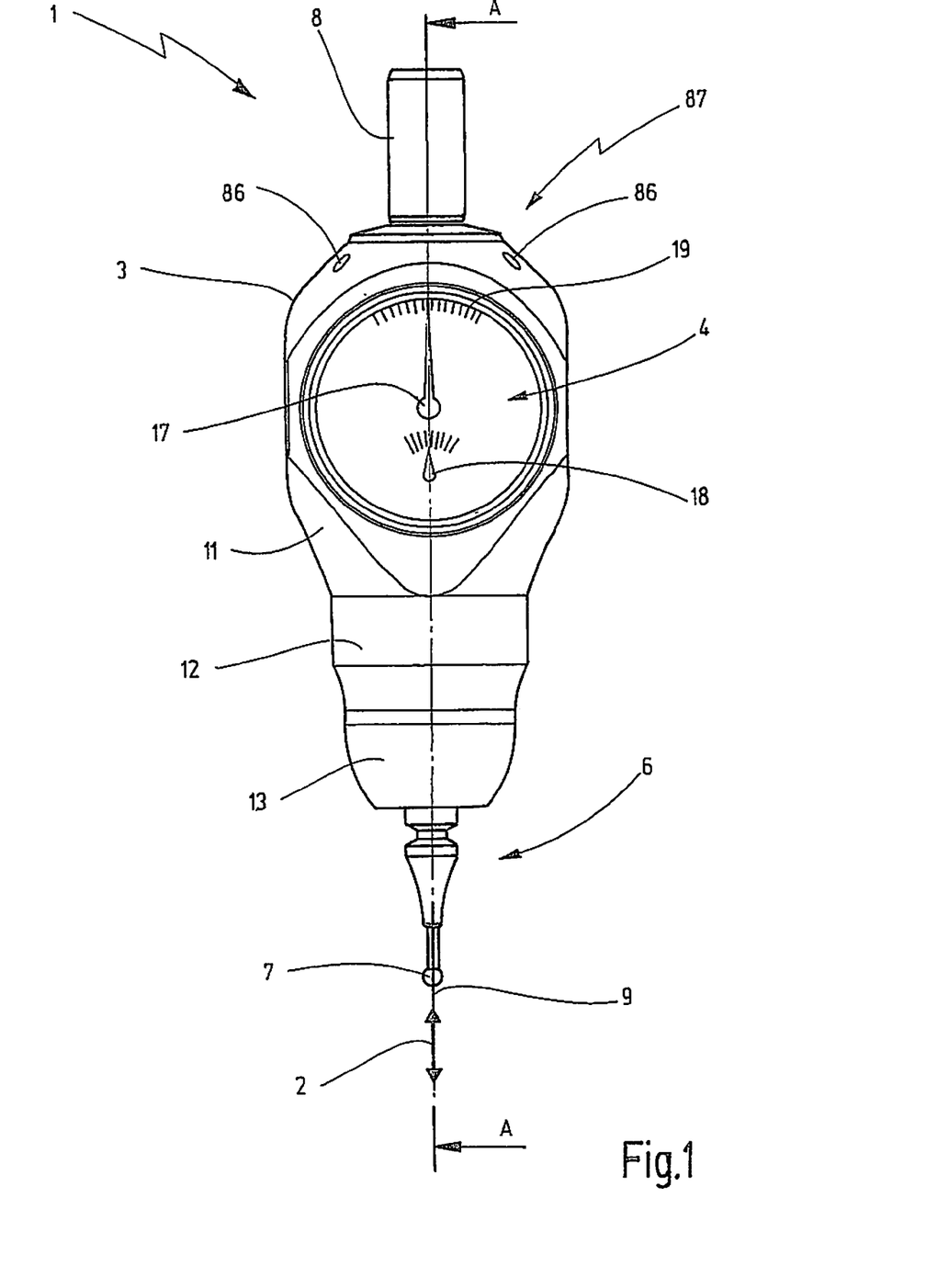
FIG. 1 shows a top view onto an embodiment of a 3D contact measuring device according to the invention in simplified illustration.

FIG. 1 illustrates a 3D contact measuring device in a simplified illustration, which can be used, e.g., for adjusting the zero point of a numerically controlled machine tool in relation to the workpiece, which is to be machined, or for positioning tasks for positioning a workpiece in relation to a measuring or machining machine. The contact measuring device thereby provides for a sensing of workpieces, both in longitudinal direction of the contact measuring device, as it is suggested in FIG. 1 by means of a double arrow 2, as well as in any direction, which is vertical to the longitudinal direction 2.

As can be seen from FIG. 1, the 3D contact measuring device 1 comprises a housing 3 comprising a display device 4, which is provided in the area of its housing side, which faces the observer, a sensing arm 6 projecting from the housing 3 and, at its free end, bearing a spherical sensing tip 7 for sensing a workpiece, and a clamping shank 8, which is provided at the longitudinal end of the housing 3 opposite the sensing tip 7, for clamping the contact measuring device in the tool holder of the machine tool, e.g. The sensing arm 6 can be deflected axially, along the measuring axis 9, which coincides with the longitudinal axis 2 of the contact measuring device 1, and/or in any radial direction, transverse to the measuring axis 9, which provides for a three-dimensional sensing of a workpiece.

Figure 2:
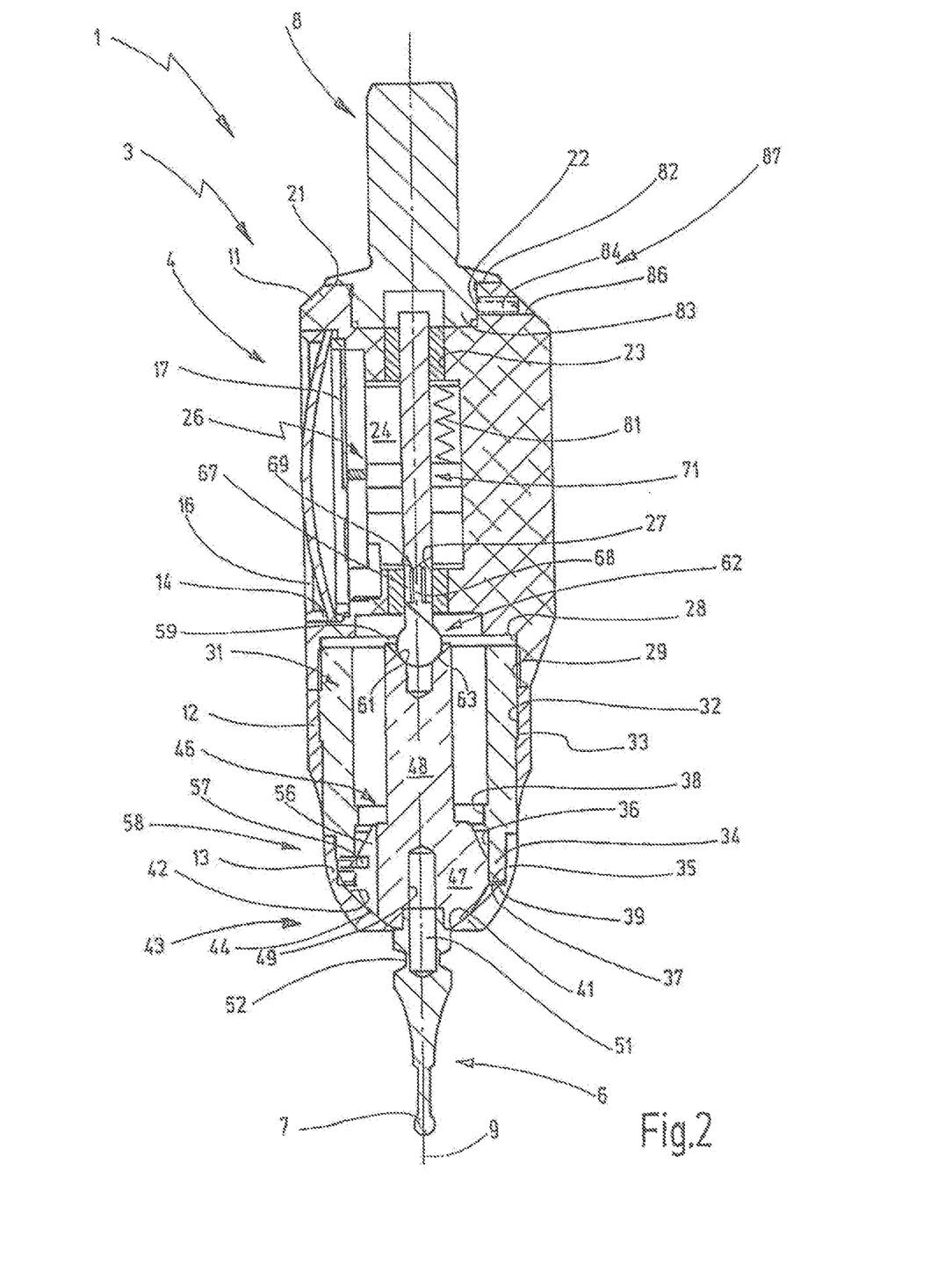
FIG. 2 shows a longitudinal sectional view of the 3D contact measuring device according to FIG. 1, cut along line A-A in FIG. 1.
Figure 3:
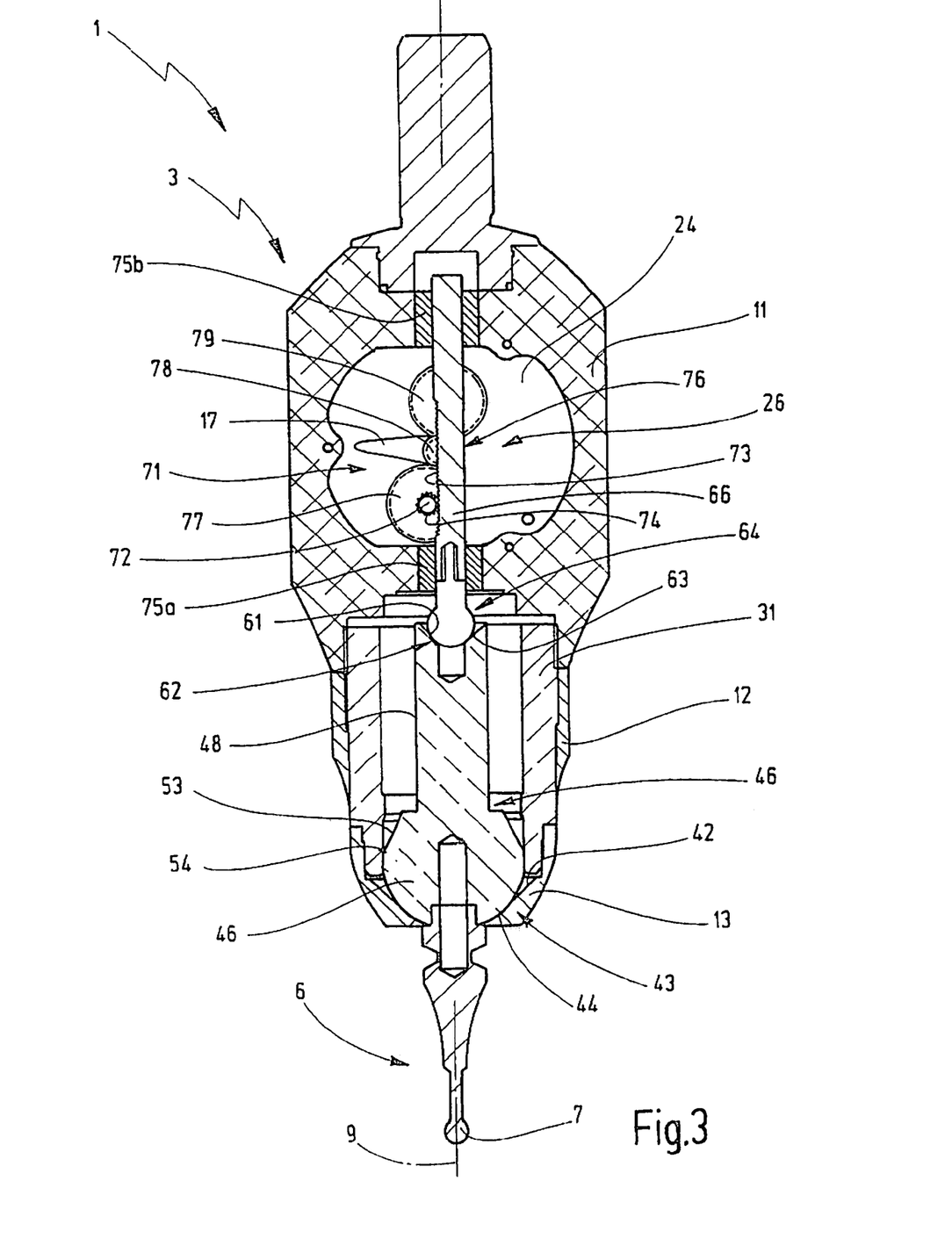
FIG. 3 shows a longitudinal sectional view of the 3D contact measuring device according to FIG. 1, cut in a sectional plane, which is vertical to the sectional plane according to FIG. 2, in simplified illustration.

The 3D contact measuring device illustrated in FIG. 1 is illustrated in larger details in FIGS. 2 and 3, which show longitudinal sections through the contact measuring device 1 along the sectional plane A-A (FIG. 2) illustrated in FIG. 1 and along a sectional plane (FIG. 3), which is vertical thereto and which includes the measuring axis 9.

As can be seen from FIGS. 2 and 3, the housing 3 comprises a multi-part construction comprising a first housing section 11, in which the display device 4 is arranged, a second housing section 12 adjacent to the first housing section 11, and a housing cover 13, which closes the housing 3 at the front end face of the housing 3, which faces the sensing tip.

The first housing section 11 comprises a window-like opening 14 in which the display device 4, which can be read from outside, is arranged. The opening 14 is closed to the outside by means of a transparent cover plate 16, which consists of glass or plastic, e.g.

The display device 4 is configured herein as analogous display at least comprising a main indicator 17, which is rotatably supported approximately in the center of the display field, if applicable comprising an auxiliary or precision indicator 18, and a division scale 19, which is only suggested herein, to which numbers are assigned, if applicable, which are not illustrated in detail herein. However, provision could also be made for a numerical display or for a graphic display.

At its end face, which faces away from the sensing tip 7, the first housing section furthermore comprises a flat front surface 21, in which provision is made for a borehole 22, which is centrically to the longitudinal axis 2. The borehole 22 is connected via a passage opening 23 to an inner space 24 of the first housing section 11, in which a measuring device 26 of the contact measuring device 1 is arranged. The measuring device 26 will be described below in more details.

The inner space 24 is connected via a further passage opening 27 to a front opening 28 at the end face of the first housing section 11 facing the sensing tip 7, which is formed so as to be staged and which bears an internal thread 29 at its outer cylindrical section. The front opening 28 and the internal thread 29 are equipped to accommodate a guide sleeve 31, which is explained below in more details.

The second housing section 12 is arranged at the front end face of the first housing section 11 facing the sensing tip 7 and is substantially formed as cylindrical sleeve. It serves to secure the guide sleeve 31 to the first housing section 11 and comprises an internal thread 32 for screwing to the guide sleeve 31 for this purpose.

The guide sleeve 31 is formed substantially cylindrically and sits in the front opening 28 of the first housing section 11. At its end of its outer surface adjacent to the front opening 28, said guide sleeve comprises an external thread 33, which is screwed into the internal thread 29 of the front opening 28 and which is furthermore screwed to the internal thread 32 of the second housing section. The guide sleeve 31 comprises a front section 34, which faces the sensing tip 7, comprising a reduced outer diameter, which bears a further external thread 35 for screwing to the housing cover 13.

At a distance to its front side 37, which faces the sensing tip, the substantially cylindrical inner surface 36 of the guide sleeve comprises a ring-shaped constriction 38, which projects inwardly.

The housing cover 13 is formed in a substantially cup-shaped manner and, at its end facing the second housing section 12, comprises an internal thread 39, which is formed so as to match the external thread 34 of the guide sleeve 31 and which is screwed thereto. In the front side of the housing cover 13 facing the sensing tip 7, provision is made for a through hole 41, through which the sensing arm 6 projects outwardly.

An inner surface 42 between the through hole 41 and the internal thread section 39 comprises a design, which is rotationally symmetrical around the measuring axis 9 and which has the shape of a truncated cone, comprising a linear generatrix and serves as inner control surface of a first universal joint 43 for pivoting the sensing arm 6 relative to the measuring axis 9. The inner control surface 42 interacts with an outer control surface 44 of the first universal joint 43, which is provided at a sensing lever 46.

The sensing lever 46 comprises an elongated design comprising a spherical joint head 47 and a bolt section 48, which extends therefrom. In the resting position illustrated in the figures, the sensing lever 46 is arranged centrically to the measuring axis 9 with its longitudinal extension from the joint head 47 across the bolt section 48.

On the side facing the sensing arm 6, the joint head 47 comprises a convex, spherical design, which is rotationally symmetrical to the measuring axis 9, comprising a generatrix, which has the shape of a segment of a circle, which defines the outer control surface 44 of the first universal joint 43, which is supported in the truncated cone-shaped inner surface 42 of the housing cover 13 so as to be rotatable in all directions.

In the spherical outer surface 44 of the sensing lever 46, a blind hole 49 is formed on the front side, into which a section of a stud screw 51 is screwed, the other section of which projects from the front side of the joint head 47 and bears the sensing arm 6. The sensing arm is screwed to the section of the stud screw 51, which projects away.

The sensing arm 6 comprises an elongated, needle-shaped design, starting at the end of the joint head 47 on the front side to the spherical sensing tip 7 and is arranged centrically to the measuring axis 9 in the illustrated resting position. In the vicinity of the front end of the stud screw 51, the sensing arm 6 comprises a local constriction 52, which defines a thin-walled area, which represents a predetermined breaking point for the event of inadmissible, in particular radial loading.

Again with reference to the sensing lever 46, it can be seen from FIGS. 2 and 3 that, adjacent to the spherical outer control surface 44, the joint head 47 comprises a section 53, which tapers in the direction away from the sensing arm 6 and which is formed rotationally symmetrically to the measuring axis 9, in a truncated cone-shaped manner comprising a linear generatrix. At the transition between the spherical control surface 44 and the truncated cone-shaped section 53, at a location, at which the tangent at the control surface 44 runs substantially parallel to the measuring axis 9, a narrow, ring-shaped bearing position 54, which has a substantially punctiform cross profile, of the joint head 47 is formed, which is in contact with the inner surface 36 of the guide sleeve 31 and which is guided through the latter in response to an axial displacement of the sensing lever 46 along the measuring axis 9.

At its outer surface, the joint head 47 furthermore comprises a longitudinal slit 56, which runs substantially parallel to the measuring axis 9, with which a pin 57 engages, which is fastened to the guide sleeve 31 and which projects radially inwardly (FIG. 2), so as to form an anti-rotation device 58, which prevents the rotation of said sensing lever about the measuring axis 9, for the sensing lever 46 together with the longitudinal slit 56.

The truncated cone-shaped section 53 merges via a stage into the bolt-shaped section 48, which extends into the front opening 28 of the first housing section 11. A cone surface 61, which is rotationally symmetrical about the measuring axis 9 and which widens outwardly toward the first housing section 11, comprising a linear generatrix herein, which forms an inner control surface of a second universal joint 62 of the contact measuring device 1, is arranged in the front surface 59 of the sensing lever 46, which faces the first housing section 11. The cone surface 61 is pivotable supported on a spherical outer control surface 63 of the second universal joint 62, which is formed at a coupling element 64.

The coupling element 64 couples the sensing lever 46 effectively to the measuring device 26 so as to convert a pivoting of the sensing lever 46 into linear axial displacement of a toothed rack 66 of the measuring device 26. The coupling element 64 can be integrally molded directly to an end face 67 of the toothed rack 66 facing the sensing lever 46, can thus be formed integrally therewith. In the embodiment illustrated in the figures, the coupling element 64, however, is a component, which is separate from the toothed rack 66. Adjacent to the spherical outer surface 63, it comprises a conical appendage 68, which is releasably connected on the front side to the end face 67 of the toothed rack 66 via a screw connection 69.

The measuring device 26 herein is configured as a mechanical gauge and comprises a gear transmission 71, to which the toothed rack 66 and a rack and pinion gear 72, which cogs therewith, belong. In a circumferential section of its otherwise cylindrical outer surface, the toothed rack 66 comprises a toothing 73, which runs along its extension and which engages with a front toothing 74, which is provided at the rack and pinion gear 72. Provision can also be made for a helical toothing at the toothed rack 66, 72.

The toothed rack 66 is supported and guided so as to be axially movable in axial slide bearings 75a, 75b, which are provided at a distance to one another along the measuring axis 9, herein in particular in the passage openings 23, 27 of the first housing section 11.

On principle, the indicator 17 of the display device 4, which is illustrated in FIG. 1, could be connected directly to the rack and pinion gear 72. In the case at hand, however, provision is made for an additional conversion stage comprising a mechanism 76, so as to convert a small linear gliding path of the toothed rack 66 into a relatively large rotary deflection of the indicator 17. For this purpose, the mechanism 76 comprise a coaxial transfer pinion 77, which does not rotate with the rack and pinion gear 72 and which engages with an indicator pinion 78 so as to engage therewith via a front toothing. Said indicator pinion is connected to the indicator 17 in a non-rotatable manner. Optionally, provision can be made for a further gear 79 for compensating plays in the gear transmission 71. A play compensation spring, which can also fulfill the function of pretensioning the toothed rack 66 outwardly in the direction of the sensing lever 46 or the sensing tip 7, respectively, can also be assigned to the gear 79 herein. However, provision is preferably made for this purpose for a separate spring 81, as it is illustrated only in a schematized manner in FIG. 2 and which is supported, e.g., on the housing 3 on the one hand and on the toothed rack 66 on the other hand such that the toothed rack 66 is pressed outwardly in the direction of the sensing tip 7.

At the end of the housing 3, which faces away from the sensing tip 7, the clamping shank 8 is arranged, which comprises a radial flange 82 and an axial appendage 83. The radial flange 82 rests against the flat outer front surface 21 of the housing 3, while the axial appendage 83 engages with the borehole 22 provided in the housing end. The diameter of the cylindrical outer surface of the axial appendage 83 is thereby slightly smaller than the inner diameter of the borehole 22, so that the axial appendage 83 is accommodated in the borehole 22 with slight radial play. Three or more screws 84, only one of which is suggested in FIG. 2, are in each case screwed into respective radial threaded holes 86, which are arranged so as to be distributed around the circumference of the housing section 11 and which lead through the latter to the inner surface of the borehole 22. By means of the screws 84, the clamping shank 8 can be adjusted in the desired radial position and can be fixed such that the assembly axis of the clamping shank, which corresponds to the machine spindle axis, coincides with the measuring axis 9 of the contact measuring device. An adjusting and centering device 86 is thus created for the contact measuring device 1.

The 3D contact measuring device 1 according to the invention, which has been described insofar, works as follows:

During operation, the contact measuring device 1 is used, e.g., for adjusting the zero point position of a numerically controlled machining machine, e.g., relative to a workpiece, which is to be machined. For this purpose, the contact measuring device 1 is clamped into the machine spindle with the clamping shank 8 and is aligned accurately by means of the adjusting and centering device 86. In the non-deflected initial or resting state, which is illustrated in the figures, the significant components of the contact measuring device 1, in particular the sensing arm 6 comprising the sensing tip 7, the sensing lever 46 comprising the universal joint head 47 and the bolt section 48, the coupling element 64 and the toothed rack 66 of the measuring device 26 are all arranged with their longitudinal alignments along the and centrically to the measuring axis 9, which coincides with the longitudinal axis (quasi axis of symmetry) of the contact measuring device 1. Due to the centrical arrangement of these components, the contact measuring device 1 according to the invention comprises an extremely small disturbing contour and slim shape in radial direction. The system for converting the deflection of the sensing arm 6 into the displacement of the toothed rack 66 uses only a few components, which are constructed in a relatively simple manner, which result in a robust, reliable construction and in a high functional reliability.

If a workpiece is sensed axially with the sensing tip 7, the arrangement of the sensing arm 7, the sensing lever 46, the coupling element 64 and the toothed rack 66 is pressed against the effect of the pretensioning force of the spring 81 axially along the measuring axis 9 further into the interior of the housing 3 in the direction of the clamping shank 8. In response to its axial displacement at the punctiform bearing point 54, the joint head 47 is thereby guided in a low-friction manner through the cylindrical inner surface 36 of the guide sleeve 31, while the toothed rack 66 is guided accurately through the slide bearings 75a, 75b. The axial displacement of the sensing arm 6 is converted into a rotary motion of the indicator 17 via the gear device 71 of the measuring device 26. The size thereof can be read from outside via the display 4.

If a workpiece is sensed with the sensing tip 7 transverse to the measuring axis 9, the joint head 47 comprising the sensing arm 6 fastened thereto pivots about a pivot point, which is defined by the first universal joint 43 and which is substantially located on the measuring axis 9 in the area of the spherical joint head 47. The end face 59, which is located at a distance from the joint head 47, is pivoted together with the cone surface 61 through this. The cone-shaped inner control surface 61 thereby glides along the spherical outer control surface 63 of the coupling element 64 and acts axially thereon such that the pivot movement of the sensing lever 46 is converted into an axial displacement of the coupling element 64 and of the toothed rack 66, which is entrained therewith. The axial displacement of the toothed rack 66, in turn, is measured by means of the measuring device 26 in that it is converted into a rotation of the indicator 17 of the display device 4 via the gear transmission 71. Due to the explained design of the inner and outer control surfaces 42, 44 and 61, 63 of the first or second universal joints 43, 62, respectively, with suitably chosen radii and cone angles, it can be attained that the radial deflection of the sensing tip 7 is converted into the axial adjusting stroke of the toothed rack 66 effected by the pivot movement of the sensing lever 46 in a linear proportional 1:1 ratio. In other words, the deflection of the indicator 17 in response to an axial displacement of the sensing tip 7 about a predetermined path corresponds to the deflection of the indicator in response to a pivoting of the sensing tip transverse to the measuring axis 9 about the same path.

During measuring operation, the sensing arm 6, which projects from the housing 3, can inadvertently be subjected to impact loads caused by collision with an obstacle, which can be transferred to the measuring device 26 via the active components of the contact measuring device 1 and which can damage it. To avoid this, provision is made at the contact measuring device 1 according to the invention for a number of safety features, which can prevent damages or which can at least limit them. For example, the cylindrical inner surface of the guide sleeve 31 serves as lateral stop in response to transverse loads, while the constriction 38 in the inner surface 36 forms an axial stop, which limits the maximum axial stroke of the sensing lever 46 in the guide sleeve 31. In response to transverse loads, which result in a pivoting of the sensing lever, the cone surface 61 of the sensing lever 46 can furthermore disengage from the spherical outer surface 63 of the coupling element 64, so that the spherical outer surface 63 is pressed out into the front surface 59 outside of the cone surface. The axial stroke, which is thereby carried out by means of the toothed rack 66, thereby does not reach the limit of the measuring range of the measuring device 26. Finally, the local constriction 52, which is provided at the sensing arm 6, ensures a controlled predetermined breaking, when a load acting on the sensing arm 6 exceeds a predetermined load limit.

Numerous modifications are possible in the context of the invention. For example, a numerical display can also be provided instead of the analogous indicator display 4, wherein the axial displacement of the toothed rack or of another measuring rack, respectively, is detected in a suitable manner and is converted into a number output. A contact-free measuring system on a capacitive or on an inductive base, can also serve to detect the axial displacement of the toothed or measuring rack, respectively. On principle, the contact measuring device 1 and the housing 3 can assume different shapes, wherein the centrical arrangement of the sensing arm 6, of the sensing lever 46 and of the toothed rack 66 or of another measuring rack of the measuring device in the measuring axis 9, respectively, is of significant importance, however, because it creates the basis for a compact, simple and robust construction comprising a small construction volume and a small number of components as well as for a long and functionally reliable use.

A 3D contact measuring device, in particular for sensing workpieces for adjusting the zero point of a numerically controlled machine tool, comprises an elongated housing 3, a sensing arm 6 projecting from the housing 3 and bearing a sensing tip 7, said sensing arm being movable relative to the housing 3 in the direction of a measuring axis 9 and pivotable in all directions about the measuring axis 9, a sensing lever 46 fixedly connected to the sensing arm 6 and rotatably supported at its end facing the sensing arm 6 by means of a first universal joint 43 on the housing 3 and rotatably supported at its end facing away from the sensing arm 6 via a second universal joint 62, and a measuring device 26 for detecting a parameter characterizing the displacement and/or pivoting of the sensing arm 6, wherein the measuring device 26 comprises a gear transmission 71 comprising an elongated toothed rack 66, which is aligned along the measuring axis 9 and movably mounted, and is coupled via the second universal joint 62 to the sensing lever 46. In the non-pivoted resting state of the sensing arm 9, the sensing arm 6, the sensing lever 46 and the toothed rack 66 are all arranged centrically to the measuring axis 9. The contact measuring device 1 has a simple, robust and compact construction.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A 3D contact measuring device in particular for sensing workpieces in machine tools, which comprises:
   a housing (3);
   a sensing arm (6) projecting from the housing (3) and bearing a sensing tip (7), said sensing arm being movable relative to the housing (3) in the direction of a measuring axis (9) and pivotable all directions about the measuring axis (9) by means of a first universal joint (43);
   a sensing lever (46) connected to the sensing arm (6), at the end of which, which faces the sensing arm (6), a joint head (47) is formed, which comprises an outer control surface (44), which is rotatably supported at an inner control surface of the housing (3), so as to form the first universal joint (43) for pivoting the sensing arm (6), wherein, at its end (59), which faces away from the sensing arm (6), the sensing lever (46) comprises a further control surface (61) for a second universal joint (62); and
   a measuring device (26) for detecting a parameter characterizing the displacement and/or pivoting of the sensing arm (6), wherein the measuring device (26) comprises an elongated toothed rack (66) of a gear transmission (71), which is aligned along the measuring axis (9), is movably mounted, and is coupled via the second universal joint (62) to the sensing lever (46), wherein the toothed rack (66) holds a coupling element (64) rigidly connected thereto and jointy displaceable therewith, wherein the coupling element (64) comprises a control surface (63) of the second universal joint (62) cooperating with the further control surface (61) to couple the sensing lever (46) to the toothed rack (66), and
   wherein, in the resting state, the sensing arm (6), the sensing lever (46) and the toothed rack (66) together with the coupling element (64) are all arranged centrically to the measuring axis (9).

2. The 3D contact measuring device according to claim 1, characterized in that, in the resting state, the sensing arm (6), the sensing lever (46) and the toothed rack (66) are arranged behind one another in and with their longitudinal alignment along the measuring axis (9).

3. The 3D contact measuring device according to claim 2, characterized in that the housing (3) is formed in multiple parts and comprises at least a first housing section (11), which accommodates the measuring device (26) and a display device (4) for displaying the parameters detected by means of the measuring device, a housing cover (13), which is releasably fastened at an end area of the contact measuring device (1) adjacent to the sensing tip (7), and a second housing section (12), which is arranged between the first housing section (11) and the housing cover (13) and which accommodates a guide sleeve (31) for guiding the sensing lever (46) along the measuring axis (9) in a longitudinally movable manner.

4. The 3D contact measuring device according to claim 3, characterized in that the guide sleeve (31) comprises a cylindrical inner surface (36) for axially guiding the sensing lever (46) and a constriction (38) in the inner surface (36), which forms an end stop for limiting the axial displacement of the sensing lever (46) in the guide sleeve (31).

5. The 3D contact measuring device according to claim 1 characterized in that the inner control surface (42) of the first universal joint (43) has a rotationally symmetrical, truncated cone-shaped design around the measuring axis (9), including a linear generatrix, and the outer control surface (44) of the first universal joint (43) has a convex design which is rotationally symmetrical to the measuring axis (9), including a generatrix, which has the shape of a segment of a circle.

6. The 3D contact measuring device according to claim 5, characterized in that the housing cover (13) bears the inner control surface (42) of the first universal joint (43) and forms a part of a replaceable structural unit which comprises the sensing arm (6), the sensing lever (46) and the guide sleeve (31), for guiding the sensing lever (46) along the measuring axis (9) in a longitudinally movable manner.

7. The 3D contact measuring according to claim 1, characterized in that the sensing arm (6) held at the sensing lever (46) so as to replaceable.

8. The 3D contact measuring device according to claim 1, characterized in that the sensing arm (6) comprises a constriction (52) as overload protection against excessive impact loads.

9. The 3D contact measuring device according to claim 1, characterized in that the a joint head (47) has an area (44), which is spherical at least in a part area and which extends about an axis vertically to the measuring axis (9) across an angle of slightly larger than 180°, and a tapering area (53) adjacent to the spherical area (44).

10. The 3D contact measuring device according to claim 1, characterized in that the sensing lever (46), in its front surface (59), which is located opposite the spherical joint had (47), comprises a cone surface (61), which is rotationally symmetrical around the measuring axis (9) and which widens towards the toothed rack (66), having a substantially linear generatrix, which forms an inner control surface of the second universal joint (62), which interacts with an outer control surface (63) of the second universal joint (62).

11. The 3D contact measuring device according to claim 1, characterized in that the coupling element (64) comprises a spherical end (63), which defines the control surface (63) of the second universal joint (62) cooperating with the further control surface (61).

12. The 3D contact measuring device according to claim 11, characterized in that the coupling element (64) is a component, which is separate from the toothed rack (66) and is releasably attached to an end face (67) of the toothed rack (66).

13. The 3D contact measuring device according to claim 11, characterize in that the coupling element (64) is formed integrally at the toothed rack (66).

14. The 3D contact measuring device according to claim 1, characterized in that the gear transmission (71) comprises at least one rack and pinion gear (72), which engages with the toothed rack (66) and which comprises a transfer mechanism (76), which converts the rotation of the rack and pinion gear (72) into a rotary motion of an indicator (17) of a display device (4) for displaying the parameters detected by the measuring device (26).

15. The 3D contact measuring device according to claim 1, characterized in that the toothed gear (66) is guided so as to slide through slide bearings (75a, 75b) along the measuring axis (9) and comprises a maximum axial displacement path, which is specified by the second universal joint (62) and which is smaller than the maximum stroke length of the gear rack (66).

* * * * *

UNITED STATES PATENT AND TRADEMARK OFFICE
CERTIFICATE OF CORRECTION

PATENT NO.        : 9,551,559 B2                    Page 1 of 1
APPLICATION NO.   : 14/366980
DATED             : January 24, 2017
INVENTOR(S)       : Ralf Tschorn It is certified that error appears in the above-identified patent and that said Letters Patent is hereby corrected as shown below:

In the Claims

In Column 13, Line 2, please insert -- , -- after device.
In Column 14, Line 15, please insert -- is -- after arm (6).

Signed and Sealed this
Seventh Day of March, 2017

Michelle K. Lee
*Director of the United States Patent and Trademark Office*